US010567534B2

(12) United States Patent
Sathish

(10) Patent No.: US 10,567,534 B2
(45) Date of Patent: Feb. 18, 2020

(54) APPARATUS, METHOD AND COMPUTER PROGRAM PRODUCT FOR SHARING DATA

(75) Inventor: Sailesh Sathish, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 318 days.

(21) Appl. No.: 14/414,429

(22) PCT Filed: Aug. 15, 2012

(86) PCT No.: PCT/FI2012/050787
§ 371 (c)(1),
(2), (4) Date: Jan. 12, 2015

(87) PCT Pub. No.: WO2014/027132
PCT Pub. Date: Feb. 20, 2014

(65) Prior Publication Data
US 2015/0172404 A1 Jun. 18, 2015

(51) Int. Cl.
*G06F 15/16* (2006.01)
*H04L 29/08* (2006.01)
(Continued)

(52) U.S. Cl.
CPC ............. *H04L 67/26* (2013.01); *G06F 3/041* (2013.01); *H04L 47/80* (2013.01); *H04W 4/029* (2018.02)

(58) Field of Classification Search
None
See application file for complete search history.

(56) References Cited

U.S. PATENT DOCUMENTS 8,090,780 B2 * 1/2012 Hjelmeland Almas ......................
G06Q 10/107
455/404.2
9,179,256 B1 * 11/2015 Pietraniec ............. H04W 4/021
(Continued)

FOREIGN PATENT DOCUMENTS

CN 101681452 A 3/2010
CN 101933039 A 12/2010
EP 2114041 A1 11/2009

OTHER PUBLICATIONS

"Sparsh Touch the Cloud", Fluid Interfaces Group MIT Media Lab, Retrieved on Apr. 28, 2016, Webpage available at : http://www.pranavmistry.com/projects/sparsh/.
(Continued)

*Primary Examiner* — Phyllis A Book
(74) *Attorney, Agent, or Firm* — Alston & Bird LLP

(57) ABSTRACT

There is provided methods, apparatuses and computer program products for delivering contents from a source device to a multiple of destination devices. In an apparatus in a source device an indication of a content selected for delivery to destination devices is received and at least one delivery condition to be used to control the delivery of the selected content to the destination devices is defined. A notification regarding the selected content is formed and information on the at least one delivery condition is included in the notification. The notification is transmitted. The at least one delivery condition includes at least one of a location condition and a time condition. In an apparatus in a destination device an indication of a content selected for delivery from a source device to the apparatus is received and information of at least one delivery condition to control the delivery of the selected content to the apparatus is obtained from the notification. It is examined whether the apparatus fulfills the
(Continued)

delivery conditions; and if so, the selected content is received.

16 Claims, 6 Drawing Sheets

(51) Int. Cl.
*H04W 4/029* (2018.01)
*G06F 3/041* (2006.01)
*H04L 12/927* (2013.01)

(56) References Cited

U.S. PATENT DOCUMENTS

| | | |
|---|---|---|
| 2006/0019638 A1 | 1/2006 | Chiu et al. |
| 2008/0186926 A1 | 8/2008 | Baio et al. |
| 2008/0242319 A1* | 10/2008 | Paschetto ............ G08B 21/0283 455/456.6 |
| 2009/0011772 A1 | 1/2009 | Choi et al. |
| 2009/0061835 A1 | 3/2009 | Schmidt et al. |
| 2009/0327244 A1 | 12/2009 | Rizal |
| 2010/0120450 A1* | 5/2010 | Herz ................. H04M 3/42348 455/456.3 |
| 2011/0004665 A1 | 1/2011 | Kim et al. |
| 2011/0175832 A1* | 7/2011 | Miyazawa .............. G06F 3/041 345/173 |
| 2011/0202588 A1* | 8/2011 | Aggarwal ............... H04L 67/26 709/202 |
| 2011/0211534 A1* | 9/2011 | Schmidt ................ H04W 4/023 370/328 |
| 2011/0276637 A1 | 11/2011 | Thornton et al. |
| 2012/0136920 A1* | 5/2012 | Rosentel ................ H04H 20/59 709/203 |
| 2012/0259957 A1* | 10/2012 | Keum ................. H04L 65/4084 709/219 |
| 2014/0354406 A1* | 12/2014 | Fyke ....................... G06F 21/32 340/5.83 |

OTHER PUBLICATIONS

"TransferJet Use Cases and Application Concepts", TransferJet, Retrieved on Apr. 28, 2016, Webpage available at : http://www.transferjet.org/.

Extended European Search Report received for corresponding European Patent Application No. 12882950.4, dated Mar. 9, 2016, 7 pages.

European office action received for corresponding European Patent Application No. 12882950.4, dated Feb. 14, 2017, 5 pages.

Office action received for corresponding Chinese Patent Application No. 201280075292.4, dated Feb. 23, 2017, 8 pages of office action and no pages of translation available.

International Search Report and Written Opinion received for corresponding Patent Cooperation Treaty Application No. PCT/FI2012/050787, dated May 23, 2013, 15 pages.

Office Action from Chinese Patent Application No. 201280075292.4 dated Aug. 15, 2017, 8 pages.

Office Action for Chinese Application No. 201280075292.4 dated Dec. 25, 2017, 10 pages total.

Office Action for European Application No. 12882950.4 dated Mar. 19, 2018, 4 pages.

Office Action for Chinese Application No. 201280075292.4 dated May 17, 2019.

Office Action for European Application No. 12882950.4 dated Jun. 4, 2019.

Office Action for Chinese Applicatin No. 201280075292.4 dated Jun. 20, 2018, 20 pages.

* cited by examiner

APPARATUS, METHOD AND COMPUTER PROGRAM PRODUCT FOR SHARING DATA

RELATED APPLICATION

This application was originally filed as PCT Application No. PCT/FI2012/050787 filed Aug. 15, 2012.

TECHNICAL FIELD

The present invention relates to a method at an apparatus for providing a content for delivery to destination devices. The invention further relates to an apparatus and a computer program product for providing a content for delivery to destination devices. The invention also relates to a method at an apparatus for receiving a selected content from a source device. The invention further relates to an apparatus and a computer program product for receiving a selected content from a source device.

BACKGROUND INFORMATION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

There are many aspects to be taken into account when transferring content between devices especially if the devices are using different operating system, are of different makes, and so on. Incompatibility in software may be a reason to many of the problems. On the other hand, to transfer, users need to select data to be transferred, select a transport medium or mode and at the end entity, know which application to direct this data to. Moreover, there may be no intuitive mechanism for tying devices together either that belongs to the same user or multiple users where the tie up is due to some contextual relation.

The content to be transferred may be any kind of piece of data which can be represented in an electronic form. For example, the content may be a file containing audio information such as music, speech etc., a video clip, a picture captured by a camera and stored in a digital format, a text file, an email, an event stored in a calendar application, a presentation, etc.

The content transfer may take place e.g. between devices which are in proximity to each other. For example, a desire to transfer content may relate to devices in the same room, in a same building, or in a same event. For example, a group of people in the same event may wish to exchange content with each other by using their devices. In some other situations, the desire to transfer content may relate to devices located further away, such as in different cities, in different countries or even in different continents.

SUMMARY

This invention is related to providing a user interface (UI) framework that may allow intuitive transfer of content between a source device and destination devices that may be contextually tied. In this application the source device means a device from which the content or contents is intended to be transmitted, and the destination device means a device to which the content or contents is intended to be transmitted. For example, the source device and destination devices may be located in proximity with each other, such as in the same room, in a venue of e.g. a conference, within a certain area, within a certain range from a device from which content is to be delivered. In some embodiments the source device and the destination device need not be near each other but the destination devices can be located far away from the source device, even in a different country or in another continent. In such embodiments the source device may be used to define a range in which the destination devices should be located to enable the transfer of content.

In some embodiments the transfer of content may not require authentication of the destination device but the content may be transferred when the destination device fulfills one or more determined delivery conditions, e.g. is within the defined range at a specified time.

In some other embodiments authentication of users or devices may be required instead or in addition to one or more other determined delivery conditions.

According to a first aspect of the invention, there is provided a method comprising:
  receiving an indication of a content selected for delivery to a destination device;
  defining at least one delivery condition to be used to control the delivery of the selected content to the destination device;
  forming a notification regarding the selected content;
  including information on the at least one delivery condition in the notification; and transmitting the notification,
wherein the at least one delivery condition includes at least one of a location condition and a time condition.

According to a second aspect of the invention, there is provided an apparatus comprising at least one processor and at least one memory including computer program code, the at least one memory and the computer program code configured to, with the at least one processor, cause the apparatus to perform at least the following:
  receiving an indication of a content selected for delivery to a destination device;
  defining at least one delivery condition to be used to control the delivery of the selected content to the destination device;
  forming a notification regarding the selected content;
  including information on the at least one delivery condition in the notification; and transmitting the notification,
  wherein the at least one delivery condition includes at least one of a location condition and a time condition.

According to a third aspect of the invention, there is provided a computer program product including one or more sequences of one or more instructions which, when executed by one or more processors, cause an apparatus to perform at least the following:
  receiving an indication of a content selected for delivery to a destination device;
  defining at least one delivery condition to be used to control the delivery of the selected content to the destination device;
  forming a notification regarding the selected content;
  including information on the at least one delivery condition in the notification; and transmitting the notification,
wherein the at least one delivery condition includes at least one of a location condition and a time condition.

According to a fourth aspect of the invention, there is provided an apparatus comprising:

means for receiving an indication of a content selected for
delivery to a destination device;
means for defining at least one delivery condition to be
used to control the delivery of the selected content to
the destination device;
means for forming a notification regarding the selected
content;
means for including information on the at least one
delivery condition in the notification; and
means for transmitting the notification,
wherein the at least one delivery condition includes at
least one of a location condition and a time condition.

According to a fifth aspect of the invention, there is provided a method at an apparatus, comprising:
receiving an indication of a content selected for delivery from a source device to the apparatus;
obtaining information of at least one delivery condition included in the notification to control the delivery of the selected content to the apparatus;
examining whether the apparatus fulfills the delivery conditions; and
if so, receiving the selected content.

According to a sixth aspect of the invention, there is provided an apparatus comprising at least one processor and at least one memory including computer program code, the at least one memory and the computer program code configured to, with the at least one processor, cause the apparatus to perform at least the following:
receiving an indication of a content selected for delivery from a source device to the apparatus;
obtaining from the notification information of at least one delivery condition to control the delivery of the selected content to the apparatus;
examining whether the apparatus fulfills the delivery conditions; and
if so, receiving the selected content.

According to a seventh aspect of the invention, there is provided a computer program product including one or more sequences of one or more instructions which, when executed by one or more processors, cause an apparatus to perform at least the following:
receiving an indication of a content selected for delivery from a source device to the apparatus;
obtaining information of at least one delivery condition included in the notification to control the delivery of the selected content to the apparatus;
examining whether the apparatus fulfills the delivery conditions; and
if so, receiving the selected content.

According to an eighth aspect of the invention, there is provided an apparatus comprising:
means for receiving an indication of a content selected for delivery from a source device to the apparatus;
means for obtaining from the notification information of at least one delivery condition to control the delivery of the selected content to the apparatus;
means for examining whether the apparatus fulfills the delivery conditions; and
means for receiving the selected content adapted to receive the content, if the examining indicates that the apparatus fulfills the delivery conditions.

In some example embodiments a touch of a finger can be used to transfer data from one device to multiple of other devices. Moreover, the data does not have to be of any particular type.

Multiple security levels can be chosen. For example, users can select or set multiple types and levels of security so that somebody cannot touch and transfer data but would require authentication. Passphrase based, gesture based and/or biometric authentication may be used in different embodiments.

Methods of some embodiments may be more intuitive than touching devices together—they may give a user the feeling that the user have stored data on her/his fingertips.

In some embodiments it is possible to add validity information. For example, time information may be added so that the "data" will remain on fingertips for "t" amount of time. So any devices that the user will touch within that timeframe may get the data subject to additional authentication if required.

Metadata of the data that is being transferred may be used to automatically understand the application context the data is related to.

Many embodiments also provide the ability to work with both local connections and over the a communication network (e.g. a so-called cloud) depending on application data and authentication levels required.

Many embodiments also support multi-device fingertip touch authentication and across full screen.

Some embodiments of the invention allow multiple users to touch and share content to one or more devices where the data can be of the same application or multiple applications (for example, video transfer from different users in an event). Also the selection of multiple application data with one or more touches and selectively copying each selected data based on authentication token or gesture in addition to touch may also be enabled in some embodiments.

Proximal models and cloud models may be supported, wherein the model may be chosen depending on the authentication type required. In proximal models the content may be transmitted directly between devices without using any communication network, whereas in cloud models a communication network may be utilized in the content transfer. The proximal model may be useful when distance between devices is within an operating range of local communication means (aka short range communication) of the devices. The cloud models may be useful when the distance between the devices is larger than the operating mode of the local communication means and/or one or more of the devices do not have local communication means but only means for communicating with a communication network.

Many embodiments of the invention rely on proximity of devices that includes both spatial and temporal proximity. Some embodiments allow the use of authenticated transfer or unauthenticated insecure transfer. The security is inherent based on proximal nature of devices but can be enhanced with a single lock or lock code before the transfer. Settings can be made on the transferring client to check if a lock code or an authentication key possibly generated on one device need to be confirmed on the other device. In another embodiment, user's fingerprint may be scanned by the device and that would be used for authenticating the user which may happen both in an ad-hoc or a cloud based mode.

Users do not have to select whether data transfer occurs through the cloud or through ad-hoc local network. It may be determined by the software framework. The determination may be based on authentication requirements, type of data selected through touch, devices in proximal connection and transfer, constraints (example time validity for transfer), etc.

The level of security demanded may be tied up with application context as well as through user settings dependent on device capabilities. In terms of device requirements for high level authentication, one enhancement to devices could be single finger authentication spread across full device screen. The whole screen may then become a high end high capacitance touch screen that can be used for single finger (including finger tip) authentication.

DESCRIPTION OF THE DRAWINGS

In the following, various embodiments of the invention will be described in more detail with reference to the appended drawings, in which.

DETAILED DESCRIPTION OF SOME EXAMPLE EMBODIMENTS

In the following, several embodiments of the invention will be described in the context of short range wireless communication. It is to be noted, however, that the invention is not limited to short range wireless communication. In fact, the different embodiments have applications widely in any environment where transfer of content from one device to other devices is desired. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 3:
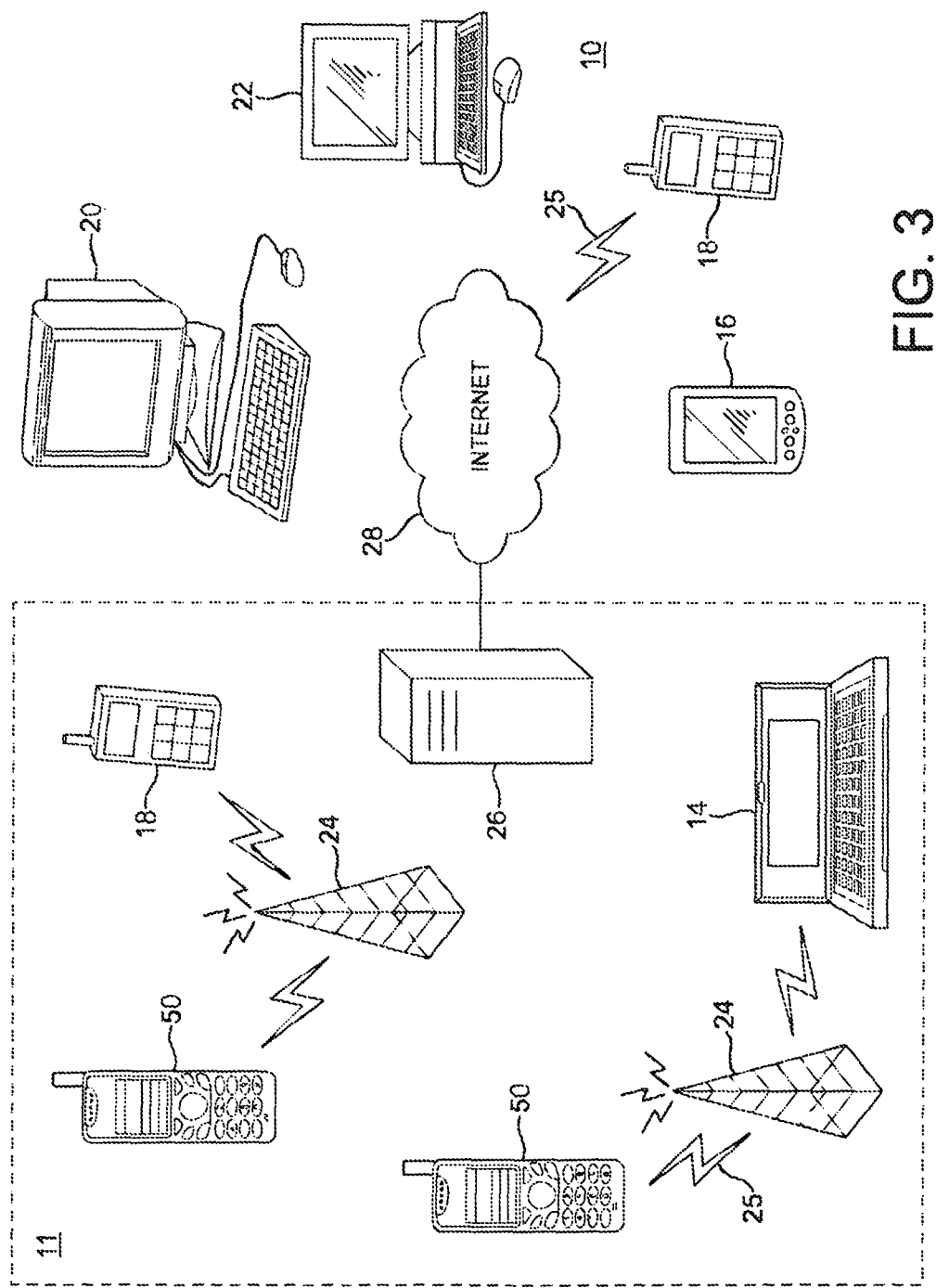
FIG. 3 shows an example of an arrangement for wireless communication comprising a plurality of apparatuses, networks and network elements.
Figure 4:
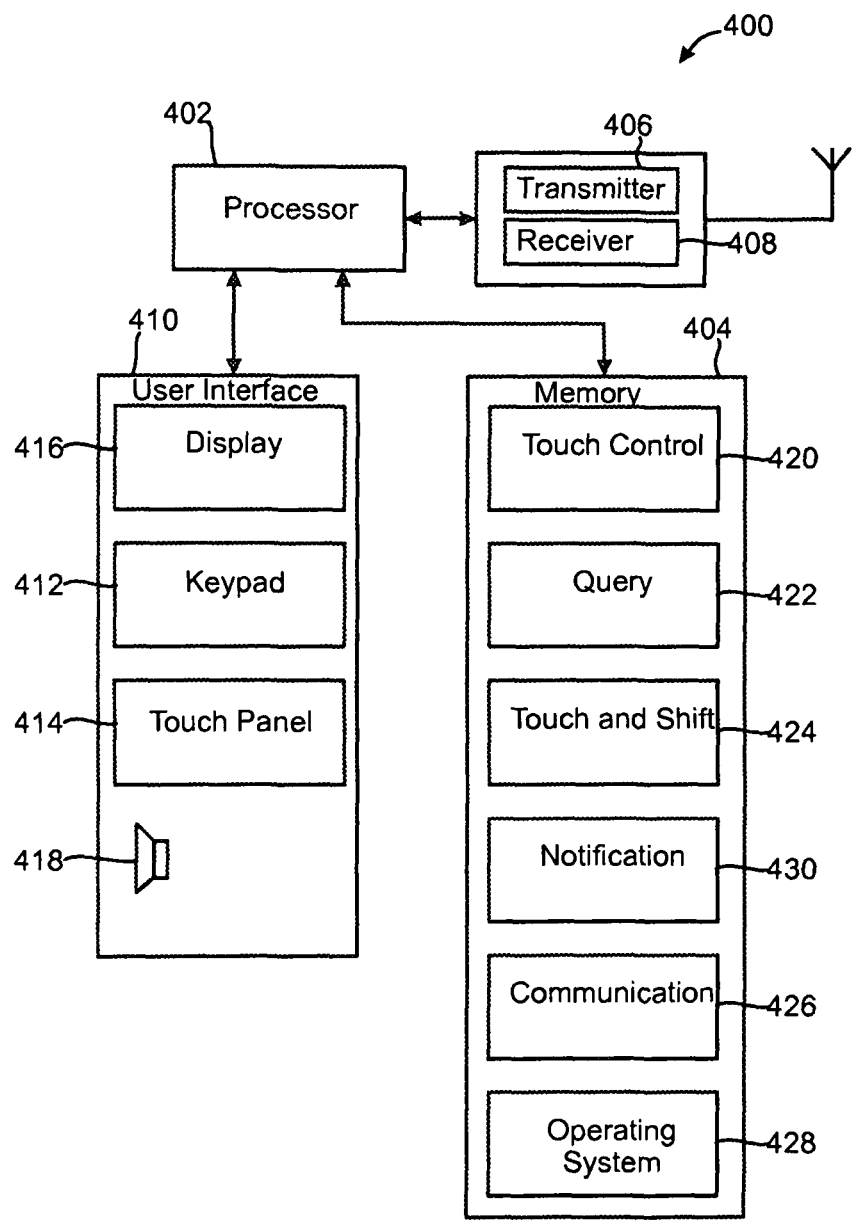
FIG. 4 shows a block diagram of an apparatus usable as a source device according to an example embodiment.

FIG. 4 depicts an example of some details of an apparatus 400 which can be used in a source device. The apparatus 400 comprises a processor 402 for controlling at least some of the operations of the apparatus 400, and a memory 404 for storing user data, computer program instructions, possible parameters, registers and/or other data. The apparatus 400 may further comprise a transmitter 406 and a receiver 408 for communicating with other devices and/or a wireless communication network e.g. via a base station 24 of the wireless communication network an example of which is depicted in FIG. 3. The apparatus 400 may also be equipped with a user interface 410 (UI) to enable the user of the apparatus 400 to enter commands, input data and dial a phone number, for example. For this purpose the user interface 410 may comprise a keypad 412, a touch sensitive element 414 and/or some other kinds of actuators. The user interface may also be used to provide the user some information in visual and/or in audible form e.g. by a display 416 and/or a loudspeaker 418. If the user interface 410 comprises the touch sensitive element 414, it may be positioned so that it is at least partly in front of the display 416 so that the display 416 can be used to present e.g. some information through the touch sensitive element 414 and the user can touch the touch sensitive element 414 at the location where the information is presented on the display 416. The touch and the location of the touch may be detected by the touch sensitive element 414 and information on the touch and the location of the touch may be provided by the touch sensitive element 414 to the processor 402, for example. For this purpose, the touch sensitive element 414 may be equipped with a controller (not shown) which detects the signals generated by the touch sensitive element and deduces when a touch occurs and the location of the touch. In some other embodiments the touch sensitive element 414 provides some data regarding the location of the touch to the processor 402 wherein the processor 402 may use this data to determine the location of the touch. The combination of the touch sensitive element 414 and the display 416 may also be called as a touch screen.

In some embodiments the keypad 412 may be implemented without dedicated keys or keypads or the like e.g. by utilizing the touch sensitive element 414 and the display 416. For example, in a situation in which the user of the device is requested to enter some information, such as a telephone number, her/his personal identification number (PIN), a password etc., the corresponding keys (e.g. alpha-numerical keys or telephone number dialing keys) may be shown by the display 416 and the touch sensitive element 414 may be operated to recognize which keys the user presses. Furthermore, although the keypad 412 would be implemented in this way, in some embodiments there may still exist one or more keys for specific purposes such as a power switch etc.

In some embodiments the touch sensitive element 414 may be able to detect more than one simultaneous touch and provide information on each of the touches (e.g. the location of each of the touches). The term simultaneous touch does not necessarily mean that each simultaneous touch begins and ends at the same time but that the simultaneous touches are at least partly overlapping in time.

When the processor 402 has received or determined information on the location of the touch the processor 402 may determine whether the touch should initiate an operation in the apparatus 400. For example, the detection of the touch may indicate that the user wants to share the document shown on the display 416 of the apparatus 400 at the location of the touch.

The user interface can be implemented in many different ways wherein the details of the operation of the user interface 410 may vary. For example, the user interface 410 may be implemented without the touch sensitive element wherein the keypad may be used to inform the apparatus 400 of a selection of a content to be delivered (shared) to one or more than one other device.

Figure 5:
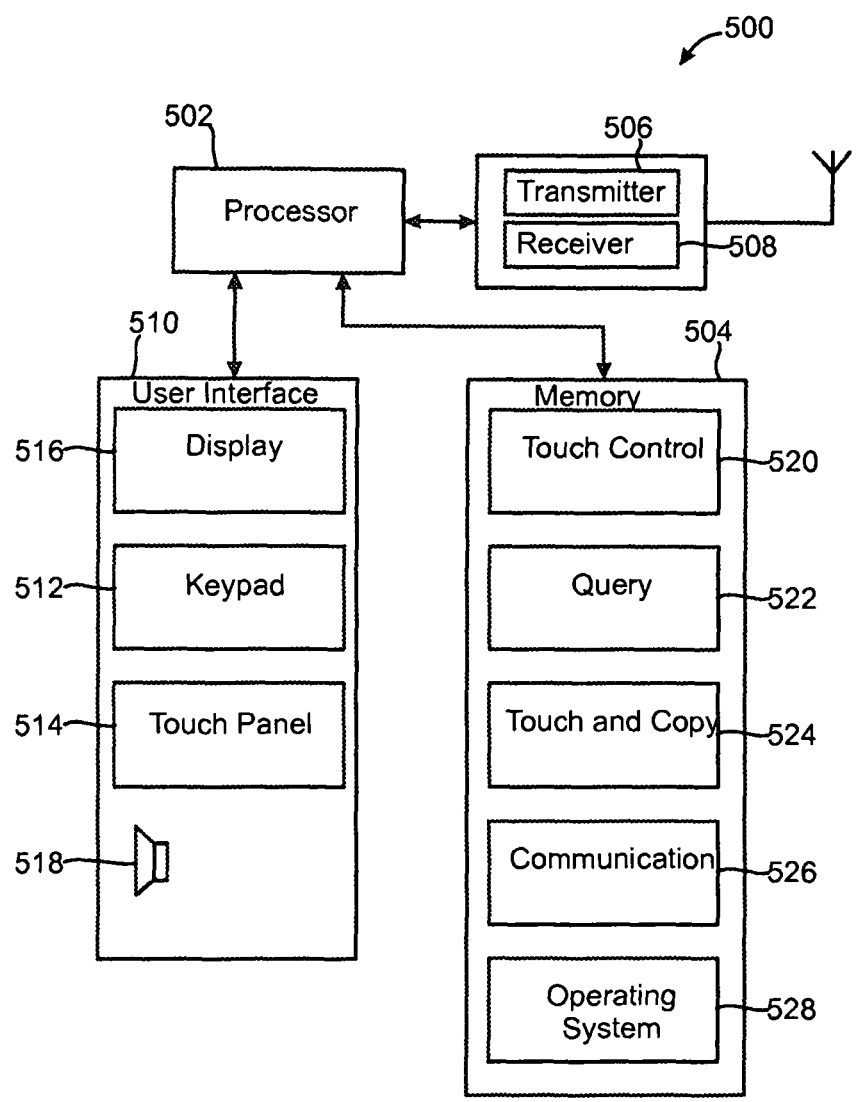
FIG. 5 shows a block diagram of an apparatus usable as a destination device according to an example embodiment.

FIG. 5 depicts an example of some details of an apparatus 500 which can be used in a destination device. The apparatus 500 comprises a processor 502 for controlling at least some of the operations of the apparatus 500, and a memory 504 for storing user data, computer program instructions, possible parameters, registers and/or other data. The apparatus 500 may further comprise a transmitter 506 and a receiver 508 for communicating with other devices and/or a wireless communication network e.g. via a base station 24 of the wireless communication network. The apparatus 500 may also be equipped with a user interface 510 (UI) to enable the user of the apparatus 500 to enter commands, input data and dial a phone number, for example. For this purpose the user interface 510 may comprise a keypad 512, a touch sensitive element 514 and/or some other kinds of actuators. The user interface may also be used to provide the user some information in visual and/or in audible form e.g. by a display 516 and/or a loudspeaker 518. The touch and the location of the touch may be detected by the touch sensitive element 514 and information on the touch and the location of the touch may be provided by the touch sensitive element 514 to the processor 502, for example.

The apparatuses 400, 500 may comprise groups of computer instructions (a.k.a computer programs or software) for different kinds of operations to be executed by the processor 402, 502. Such groups of instructions may include instructions by which a touch control element 420 may interpret the touch and initiate operations as a consequence of the touch, a query element 422, 522 to display a query for the user in certain situations after the touch has been detected, a touch and share element 424 for initiating the delivery of a content to destination devices, a touch and copy element 524 for initiating the reception of a content in the destination device, a communication element 426, 526 to exchange information between the source device and the destination device or another device to which content may be delivered, etc. In some embodiments some of the groups of computer instructions purported to implement certain operations may also be called as daemons. Daemons may be computer programs which are running "at the background" (a.k.a "sleeping daemon") and are called (executed) when some condition is fulfilled. For example, if the touch and shift element 424 were implemented as a daemon (e.g. as a Bluetooth™ daemon), the status of the touch and shift element 424 could be set to "Wait" when the touch and shift element is not needed and the status could be changed to "Active" when the touch and shift element 424 is started to execute operations on the basis of a detected touch.

The apparatuses 400, 500 may also comprise an operating system (OS) 428, 528, which is also a package of groups of computer instructions and may be used as a basic element in controlling the operation of the apparatus. Hence, the starting and stopping of daemons and other computer programs, changing status of them, assigning processor time for them etc. may be controlled by the operating system. Description of further details of actual implementations and operating principles of computer software and operating systems is not necessary in this context.

Both of the apparatuses 400, 500 may be implemented within the same device, which then can be used as the source device and the destination device, but in some other embodiments the source device comprises the apparatus 400 but not the apparatus 500, and vice versa. It should also be noted that the device comprising both apparatuses 400, 500 need not have separate processors 402, 502, user interfaces 410, 510 etc. but the functionality of both of the apparatuses 400, 500 may also be implemented using a single processor, the same user interface etc.

The source device and the destination devices need not be similar devices or devices for similar purpose. For example, the source device may be operable as a mobile phone whereas the destination device may be without mobile phone operations but is provided with local (short range) wireless communication means, such as Bluetooth™ communication means, near field communication means (Nfc) and/or communication means for communicating with a wireless local area network (WLAN). The source device may also comprise, instead of or in addition to the mobile phone operations, local wireless communication means, such as Bluetooth™ communication means, near field communication means (Nfc) and/or communication means for communicating with a wireless local area network (WLAN).

In this context the short range wireless communication may mean communication within a distance (range) of a few centimeters, a few meters, ten meters, some tenths of meters, hundreds of meters or even some kilometers. It should also be noticed that the actual range need not be accurate or symmetrical to each direction but may vary depending e.g. on possible obstacles between a source device and a destination device, radiating properties of the antenna of the source device and the destination device etc.

Figure 6:
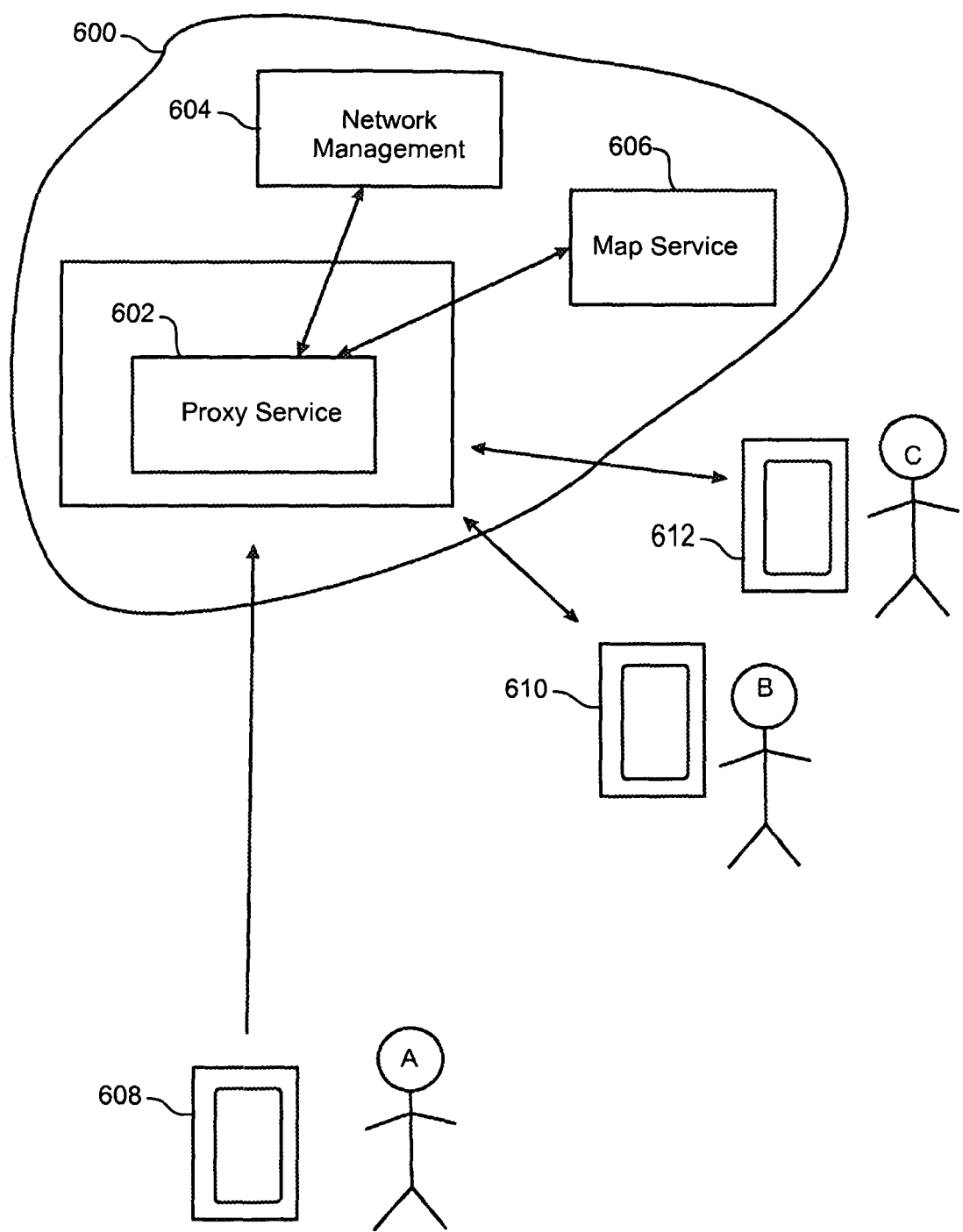
FIG. 6 shows an example situation in which some embodiments may be used.
Figure 7:
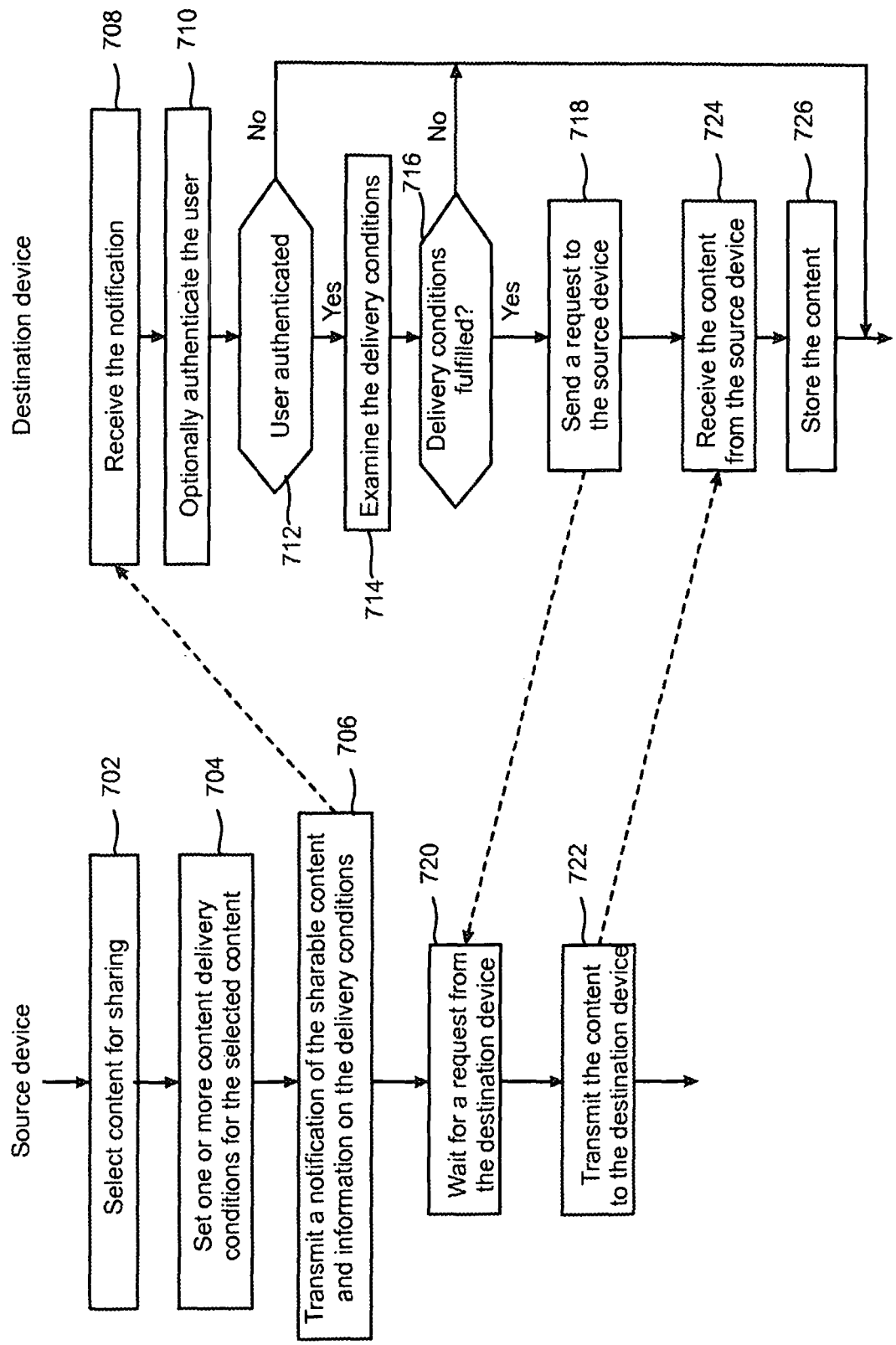
FIG. 7 shows as a flow diagram a method according to an example embodiment.

In the following, some non-limiting example situations in which the invention may be used are described in more detail. In a first example, as depicted in FIG. 6, some friends A, B, C are within a certain area, e.g. in the same room. They all may have a device 608, 610, 612 which is capable of communicating with the other devices within the same area. This kind of short range communication may be implemented e.g. via Bluetooth™, near field communication and/or WLAN, as was mentioned above, but also other kinds of short range communication may be used as well. Let's assume that the user A wants to share a media file which s/he is playing by her/his device 608 to her/his friends B, C nearby. The selection of the content for sharing is illustrated with the block 702 in FIG. 7.

In a first example embodiment the user A touches the touch sensitive element 414 of the her/his device at the location in which information regarding a media playing application is shown on the display 416. The touch sensitive element 414 provides information on the touch e.g. to the processor 402 (e.g. under the control of the operating system) which starts to run the touch control element 420 to determine which kind of operation(s) the touch should initiate. The touch control element 420 may detect that the location of the touch is on the area of the display 416. Hence, the touch control element 420 may inform the operating system to run the query element 422 to form a menu on the display 416, possibly near the location of the touch, and to read the selection made by the user. The menu may include one or more options for the user. For example, the options may include "Touch and share"—option which, when selected, initiates the delivery of the media file just being played by the media playing application to another devices i.e. to the destination devices. Other options may include, for example, "Stop" for stopping the playing of the media file, "Repeat" for repeating the media file, "Delete" for deleting the media file etc.

The selection of the option of the menu may be performed e.g. by touching the touch screen on the location where the option is shown, or by using the keypad of the apparatus. In some embodiments the selection may also be performed by voice commands e.g. by uttering "Touch and share", "first option", etc.

When the option has been selected and if the selected option is "Touch and share" (or some other option indicating the desire of the user to deliver a content to other devices), the query element 422 may inform the operating system that the user desires to deliver the content to other devices. The operating system may then start a touch and share element 424 for preparing the delivery of the selected content. The touch and share element 424 may examine the type of the selected content. The examination may be performed e.g. by examining metadata (a.k.a. metacontent) of the selected content, by examining the application which is handling the content, by examining the file extension of the content, and/or by some other appropriate means. For example, the metadata may indicate that the content is a file or a group of files containing video, audio, text, an image, an email, a contacts list, a calendar notification, etc. The touch and share element 424 may instruct the operating system to start a notification element 430 to inform other devices that there is content to be received (a shareable content). The notification element 430 may form a notification message to be transmitted (broadcasted) by the source device and may be received by all or some of the nearby devices (block 706). The notification message may include information on the shareable content, e.g. the name of the content, the type of the content, and/or one or more delivery conditions to be fulfilled by the destination device before it is allowed to receive the content (block 704). The delivery conditions may include a location condition (e.g. the location and range determining the area in which the content may be allowed to be received), a time condition (the time the content is available for receiving), a name condition (e.g. the name of the serving cell) and/or other conditions etc.

The location may be the location of the source device. The location may be defined e.g. by an optional positioning receiver (not shown) of the source device, by a wireless communication network the source device is possibly communicating with, the location of a serving cell of the wireless communication device, or by some other appropriate means. The location may be expressed in coordinates, as a text string, or by another way. The range may be expressed, for example, as a radius, wherein the location and the range define an area in which the destination device should be located to receive the content.

In some embodiments the location may also be defined by coordinates of the corners of the range within which the destination device should be located.

In some embodiments, the name condition, if used, may include the name of the serving cell of a mobile communications network, the name of a WLAN (e.g. in a venue), etc.

When a device near the source device, i.e. a potential destination device, receives the notification message (block 708), it may form an indication that a shareable content may be available. Before forming such indication, the potential destination device may examine whether the device is allowed to receive the content (blocks 714, 716). The examination may include determining the distance from the potential destination device to the source device and if the distance is within the range, determining that the location condition is fulfilled.

If the delivery conditions include the name of the serving cell (i.e. the name condition), the potential destination device may compare the name of the serving cell of the potential destination device with the name of the serving cell informed in the notification message and if they correspond with each other, the device may determine that the name condition is fulfilled.

If the determined delivery conditions are fulfilled by the potential destination device, it may start obtaining the content. Hence, the destination device may form the indication e.g. as a message on the display of the device that a shareable content is available. In some other embodiments the examination of the delivery conditions may be performed after forming the indication.

When the indication is shown on the display the user may e.g. touch the touch screen of the destination device at the location of the message to start the reception of the content. A detection of the touch may be followed by forming a menu on the display of the destination device. The menu may include one or more options such as "Copy" for receiving the content, "Ignore" for not receiving the content, etc.

If the user selects the option for receiving the content, the destination device may run a content reception element which affects the destination device to communicate with the source device for the content delivery. The communication may include transmitting a request message from the destination device to the source device identifying the content to be delivered (blocks 718, 720). The source device may then transmit the content to the destination device (blocks 722, 724). In some embodiments the communication may include establishing a communication connection between the source device and the destination device, unless the communication connection has not previously been established between the source device and the destination device.

In some embodiments the notification message is not needed but the user of the source device may inform directly of the users of the other nearby devices that there is some content available. Therefore, the users of the other devices may instruct their devices to request information of the available content from the source device and initiate reception of the content, if the delivery conditions are fulfilled.

In some embodiments the destination device may also examine the content type to determine if an application capable of handling the content is running in the destination device, and if so, providing the delivered content to the application. For example, if the delivered content is a music file and if the destination device is running a media player application, the content may be included in a play list of the media player so that the media player may begin to play back the media file.

In some embodiments the content type examination may be performed to determine whether the destination device is capable for handling the sharable content. Hence, if the determination indicates that the destination device is capable for handling the sharable content, the content delivery may be performed. Otherwise, the content delivery may not be performed, or the user of the destination device may be asked if s/he wants to receive the content although the destination device is not capable of handling it. For example, the type of the document is a video but the destination device does not have an application for presenting video.

The received content may e.g. be stored to a memory of the destination device or to a storage media to which the destination device is able to write data (block 728).

In some embodiments devices entering a certain area may automatically form a local communication network, which may also be called as an ad hoc network. Hence, a communication connection is established between devices of the ad hoc network and these communication connections may be used in the delivery of the notification message, the request message and in the actual content transmission.

In the above it was assumed that the delivery conditions do not include authorization wherein any user could use the destination device to receive the sharable conditions, if the delivery conditions are fulfilled by the destination device. However, some embodiments of the invention include user authentication and/or destination device authentication wherein every user and/or every device within a certain area may not be capable of initiating the reception of the shareable media (blocks 710, 712). There are many different kinds of options for user and device authentication and the following examples are only some non-limiting examples.

The user authentication may be performed e.g. by using a fingerprint authentication, wherein the user of the destination device may need to press a finger on the touch screen to authenticate her/himself. The whole touch screen may be capable of recognizing fingerprint, or there may be a specific region in the touch screen where the fingerprint recognition may be performed, and/or the device may comprise a separate element for fingerprint authentication. When the fingerprint has been recognized, information of the fingerprint may be compared to fingerprint information possibly included in the metadata of the shareable media. If the fingerprint information of the user matches with the fingerprint information of the shareable content, the content delivery may be performed, if all other possible delivery conditions are fulfilled as well.

The fingerprint information included in the metadata of the shareable media may be obtained by recognizing the fingerprint of the user of the source device when s/he defines the shareable content. Hence, the same user may first touch the source device and define which content(s) could be delivered to the other devices and then s/he may touch the other devices where s/he wants the content to be delivered, wherein the source device determines the fingerprint information and includes it in the metadata, and when the user touches the destination devices, they also obtain the fingerprint of the user and compare it with the fingerprint information of the metadata before allowing the content delivery. In some embodiments the fingerprint information comparison may be performed in the source device wherein the destination device sends the fingerprint information to the source device when the user has touched the destination device.

In the procedure described above it could be imagined that the sharable content is "picked" by the finger of the user of the source device, wherein the user may then "drop" the content to the destination devices.

Instead or in addition to the fingerprint authentication other types of biometric authentication methods may be applied as well as passphrase based or other authentication methods. Another biometric authentication method is based on iris recognition in which the iris of an eye may be used analogously to the fingerprint.

In the following, some non-limiting examples of other than biometric authentication methods are described. The authentication may be based on a password or a passphrase which is defined by the user of the source device and may be included in the delivery conditions. The user may then e.g. utter the passphrase or write it down on a paper so that other persons near the user may hear or read it and enter the passphrase on their devices (the destination devices) to authenticate themselves for the reception of the shareable content. In some embodiments the touch and share element or other element in the source device may select the passphrase and express it to the user of the source device wherein the user may tell the passphrase to others.

In some embodiments a gesture based approach may be used instead or in addition to the other authorization methods. The touch and share element or other element in the source device may select a gesture and indicate the selected gesture to the user of the source device. Then, the authentication may be performed by entering the selected gesture by the destination device. As an example, the gesture may be a certain kind of figure which the user need to "draw" on the touch screen of the destination device. For example, the gesture may be a circle, an ellipse, a number, a letter or another predetermined figure or a combination of figures. Thus, the user of the source device may e.g. utter "circle", "ellipse", "two", "letter b" etc. to inform the selected gesture to others.

In some embodiments the authentication may include a combination of a gesture and a password or a passphrase.

The source device may include a set of gestures from which one gesture may be selected. Hence, the source device may indicate the selected gesture by displaying the index of the selected gesture in the set of gestures wherein the user of the source device may utter the index to others.

In the above described examples mechanisms for local content delivery between devices within a short distance were described but many embodiments of the invention are also applicable to situations in which the source device and the destination device are far away from each other, e.g. in different cities, different countries or even in different continents. In such situations the content to be delivered can be stored into the source device or into a server of a communication network, e.g. in a server in a so-called cloud, or into another appropriate device. The information on the sharable content may then be provided via a communication network, e.g. via the internet, via wireless and/or wired telephone network, or via another communications network, or via a combination of these. Many principles presented above are still applicable. For example, the authentication may include fingerprint authentication, password or passphrase based authentication, gesture based authentication etc.

For example, if the user of the source device intends to deliver content from her/his device (i.e. from the source device), the user may select the content and define one or more delivery conditions as described above. The location condition may be given as a location in which the destination device should be located to be able to receive the content. Thus, the location may not depend on the location of the source device at all. The location condition may be input e.g. as coordinates of a center of an area and a radius (range) of the area, as a name of the city, a name of a WLAN at the location of the destination device, or by using some other indication of the destination location. As an example, the user of the source device may wish to send her/his friend a media file to his friend who lives in another city and may also allow the family of the friend to receive the content. The location may then include the coordinates of some point in the friend's house and the radius could be selected so that the area defined by the coordinates and the radius substantially covers the friend's house but does not cover large areas outside the house.

In some embodiments information of the location condition and/or one or more other delivery conditions may have been predefined and stored e.g. into the memory of the source device such as into a contacts list and/or as one or more parameters, wherein when the user of the source device defines the potential recipient(s) of the content the contact list and/or the parameters may be examined to find out, whether it contains predefined delivery condition(s). If so, the predefined delivery condition(s) may then be used as default delivery condition(s). The user of the source device may then accept the default delivery condition(s) or change it to another delivery condition(s). As an example, information of an assumed location of the recipient's device may have been stored into the contact list, wherein this location may be used as a default location condition. The assumed location may, for example, be the location of the home of the recipient. As another example, the time condition may be predefined to be e.g. 5 seconds, 10 seconds, half a minute, one minute, ten minutes, one day, the duration of an event, etc.

When the content has been selected for the content delivery, which utilizes one or more communication networks, and delivery conditions have been defined, the touch and share operation may include the following, and illustrated in FIG. 6.

The source device 608 may send to a proxy service 602 of the communication network 600 information on the selected content. The information may include an identifier (e.g. a name) of the content and one or more delivery conditions. The proxy service 602 may communicate with a network management service 604 to find out the destination address of the destination devices 610, 612 and routing information to be used when notifying the destination devices 610, 612 of the sharable content. This may include consulting a map service 606 which may contain information on the actual location of the destination devices 610, 612. When the routing information have been captured the proxy service 602 may then send a notification message to each of the destination devices 610, 612 to indicate them that there is some content available for them. The proxy service 602 may also examine the delivery conditions, either before obtaining the routing information or after that, and only if the destination device fulfills the delivery conditions, the proxy service 602 may continue the touch and share process for that destination device 610, 612. In other words, if the proxy service 602 examines the delivery conditions before obtaining the routing information and if a destination device 610, 612 does not fulfill the delivery conditions, the proxy service 602 need not obtain the routing information for that destination device 610, 612.

When the destination device 610, 612 receives the notification message, the destination device 610, 612 may examine the message and conclude that there is some content available for receiving. The destination device 610, 612 may then inform the user of the destination device. 610, 612 of the availability of the shareable content. The user may then decide if s/he wants to receive the content or not, or the process may continue without user intervention. If authentication is required and the user has not indicated that s/he does not want to receive the content, the authentication procedure may be initiated.

The detailed operation of the authentication procedure may vary depending on the authentication method. In the following, only some non-limiting examples are illustrated.

The authentication may be based on fingerprint authentication wherein the user of the destination device touches the touch screen or another element of the destination device which is capable of recognizing the fingerprint of the user. The recognized fingerprint information is compared with fingerprint information of the sharable content to determine whether the user is the authorized user or not. The fingerprint information may have previously been stored into the memory of the destination device, into the communication network (e.g. in the proxy server 602) or even into the memory of the source device 608. Accordingly, the comparison of fingerprint information may be performed in different parts of the system or the previously stored fingerprint information may be transmitted from the device where it has been stored to the device which is to perform the comparison.

In some embodiments, when the user of the destination device 610, 612 has authenticated her/himself, the destination device 610, 612 may generate and send a notification to the source device 608 to inform the user of the source device 608 that the user of the destination device 610, 612 has authenticated her/himself.

The authentication may also be based on password or passphrase wherein the user of the destination device may be requested to enter her/his password/passphrase for authentication. In addition to or alternatively, the authentication may utilize gestures wherein the user of the destination device is somehow informed on the gesture which s/he should enter by the touch screen of the destination device to authenticate her/himself. Information of the gesture may, for example, be transmitted to the destination device using a different communication method, e.g. as a short message (SMS), of the user of the source device 608 may call the user of the destination device 610, 612 and tell her/him the gesture, or by some other appropriate way.

As a yet another example, the authentication may be based on authentication tokens e.g. as follows. When the destination device 610, 612 establishes a communication session with the communication network, 600, the communication network 600 may define an authentication token for the destination device 610, 612 and transmit the authentication token to the destination device 610, 612. When the destination device 610, 612 needs to be authenticated, the destination device 610, 612 may then send the authentication token to the communication network 600 in which the authentication token may be used to authenticate the destination device. Hence, when the destination device 610, 612 requests the delivery of the shareable content to the destination device 610, 612, the destination device 610, 612 may include the authentication token in a request message.

After the user has been authenticated, or as a part of the authentication token based authentication, the destination device 610, 612 may send the request message to the communication network to initiate the content delivery. The request message may contain information of the content or contents to be delivered to the destination device.

The communication network 600 and the destination device 610, 612 may then communicate with each other using the communication mechanisms of the communication network to deliver the content stored in the network to the destination device 610, 612.

In some embodiments the content is not stored in the network but in the source device 608 wherein a communication session may need to be initiated between the source device 608 and the destination device 610, 612 to enable the content delivery from the source device 608 and the destination device 610, 612.

In yet some embodiments the user of the source device 608 may be able to cancel the content delivery. This may be performed e.g. by sending a cancellation message from the source device 608 to that destination device or those destination devices to which the user wishes to cancel the content delivery. If the content has not yet been transmitted to the destination device 610, 612 when the cancellation message is received, the destination device may interrupt the content delivery process. However, if the content has already been transmitted to the destination device, the destination device may remove the delivered content from the memory of the destination device.

In the cloud based model the cancellation message may not be transmitted to the destination device(s) 610, 612 but it may be sufficient to transmit the cancellation message from the source device 608 to a server or another element in the cloud which may then take actions to cancel the content delivery. If the content has not been transmitted to the destination device 610, 612 when the cancellation message is received by the server, the server may interrupt the content delivery process. However, if the content has already been transmitted to the destination device when the cancellation message is received by the server, the server may send a message to the destination device which indicates the destination device that it should remove the delivered content from the memory of the destination device.

As can be deduced from the above, the cancellation of the content delivery may in some embodiments be possible even after the user of the destination device has been authenticated to be authorized for receiving the content.

In the above examples the user selected one content for delivery but it is also possible to select more than one content for delivery and deliver all of them or at least a part of the multiple of selected contents to one or more destination devices. it may also be possible that a part of the selected contents are delivered to one destination device and another part of the selected contents are delivered to another destination device. For example, a text document, a video clip and a contact list is selected from the source device for delivery to other devices. The user may decide to copy the text document and the video clip to one destination device and to copy the video clip and the contact list to another destination document. In this kind of selective touch and share operation the user need not repeatedly perform the selection and copy (touch and share) operation for each content but may select a multiple of documents for delivery and then decide which of the selected documents are copied to which of the destination devices.

It should be noted here that although the operations have been described by using the operating system as a component for controlling the operations regarding the touch and share operations, in practical implementations the operations may also be performed without using any operating systems. Furthermore, starting and stopping an element may not actually mean that the element is always started from beginning and, respectively, stopped entirely, but the element may still exist as a background process wherein only the status of the element may be changed.

In the following some examples of uses of some embodiments of the invention will be shortly described.

Example 1

Transferring Contacts Information Between Mobile Phones

A user wishes to transfer contacts from her/his mobile phone to her/his other mobile phone(s). The user can e.g. open contacts, touch the contacts group by a finger, select touch and share option, then touch contacts on the other device and click "copy". Using the finger touch, the user has transferred contacts from one mobile phone to another mobile phone. The mobile phones need not be similar and they may even have different platforms and/or operating systems. Similarly, this can be done for any other phone containing similar functionality. In this example the devices are close to each other, for example within the range of several meters, within 10 meters or within tens of meters.

Example 2

Sharing Media Files

A person and some of her/his friends are at an event. The person asks the friends to share the media they have captured at that event. So they all touch those media files for copying and touch the phone of the person to share their media.

Example 3

Local-Mode Zero Authentication

When multiple users join a local event, they may join a local network—peer to peer connected network either over WLAN or Bluetooth or some other local network. In the zero authentication mode (no authentication), the application context may be used to identify the copy and paste ("Touch and share"). Through the application UI extension, for example, a right click may give option to touch and copy. As an example, consider that users A, B and C have recorded video of event E. A and B wish to share this video to C. A and B then right click on the recorded video on the screen, select "touch and share" option. The client framework on A and B then broadcasts this selection to all connected devices that includes A, B and C. The broadcast message consists of following (broadcast message A1)

Device ID where the touch copying has taken place

Application MIME type and meta-info that identifies the application

Meta information of the content that was copied

Time validity of copy if there is either a default or user provided one.

The broadcast message can be in any format including XML.

All devices in connection gets A1. Then if user device C is in video mode, whenever a touch is made on that application within the time period in A1, C will ask whether data can be copied including device names (or nicknames) from which the copy is made. By touching "yes" or confirming device, the copy may happen. In this way, A and B need not touch device C themselves but C can do the touch once A1 message is received simulating a touch by A or B or both.

Example 4

Local-Mode with Token Authentication

In this mode, the touch and transfer requires an additional token that is specific to the device where the touch has been made. When user A touches and copies the media, a token (that either the client generates for the user or user provides one) or a gesture is shown to the user. Then the broadcast message will be A1+authentication token or gesture+gesture tokens for multi-applications.

To transfer, A will touch device C where a relatively long press (e.g. a touch lasting couple of seconds) will bring menu asking transfer. Then by providing the authentication token or doing the gesture (such as a circular motion), the correct device and application data is identified (so in device C, A is identified) and copying happens.

Here, user A can select multiple application data for touch and copy. For each application, a separate gesture may be provided (can be in addition to a single authentication token) that identifies the application. So by touching device C and giving right gesture (and the authentication token), the correct application data is identified and transferred from a specific device.

Example 5

Local-Mode with Fingerprint Authentication

Here, user A has to only touch and select for copying (no authentication token) and can commit to a gesture in case of multiple application data selection. The broadcast message will be A1+fingerprint data+gesture tokens. At device C, A's fingerprint is authenticated and in case there are multiple gestures present in A1, then C device will ask for a particular gesture after which that application data is transferred.

Some Examples of the Cloud Model

Cloud model may be engaged when there are no proximal connections established. Cloud based transfer may be done based on context connections such as location boundaries and time boundaries. Cloud transfer can include both authenticated and non-authenticated modes. It is to be noted that a single client device may be used for both proximal connected and cloud connected mode and the client device may automatically select the mode depending on requirements. Touch transfer is the intended transfer model in both cases.

Example 6

Cloud with Zero Authentication

When touch for copying is selected on an application data, a cloud message C1 is constructed. The C1 may consist of the following information:
- Device ID where the touch copying has taken place
- Application MIME type and meta-info that identifies the application
- Meta information of the content that was copied
- Location data
- Boundary of location (default boundary or set by user)
- Time validity for copy
- Optional device types and/or device ids to which this can be copied
- Data that has been touch selected Once C1 has been received to the cloud service CS, CS will send a notification message to all devices registered with CS within the geo-coordinates and within bounding radius and time to alert for touch notification. So when A touches device C, C will send a notification to CS. The notification will include (optional) current application context on which a touch and copy has been made. CS will look at the notification parameters which include the current time, location coordinates. If these fall within the C1 received, and if optional application context matches, then data transfer will take place over the cloud.

Example 7

Cloud with Authentication Token, Gesture and/or Fingerprint Authentication

Here, C1 in addition to context data will also contain gesture data for multi-application data selections, either token or fingerprint data for authentication. In the subsequent notification message that CS sends to all clients falling within the contextual range, CS will ask either to look for authentication token or fingerprint data. When C sends back copy and paste notification message to CS (after a copy and paste action by A), CS looks for authentication token or fingerprint data plus gesture action to identify multi-application data, selects the appropriate data and transfers the same to the device.

In addition, users can choose a broadcast mode where on touching, all devices falling within geo boundary may be able to get data transfers.

Figure 1:
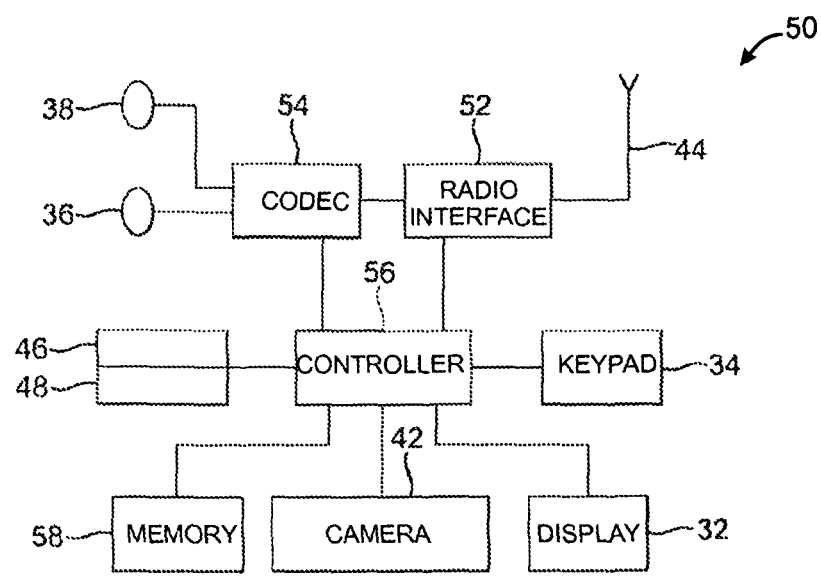
FIG. 1 shows a block diagram of an apparatus according to an example embodiment.
Figure 2:
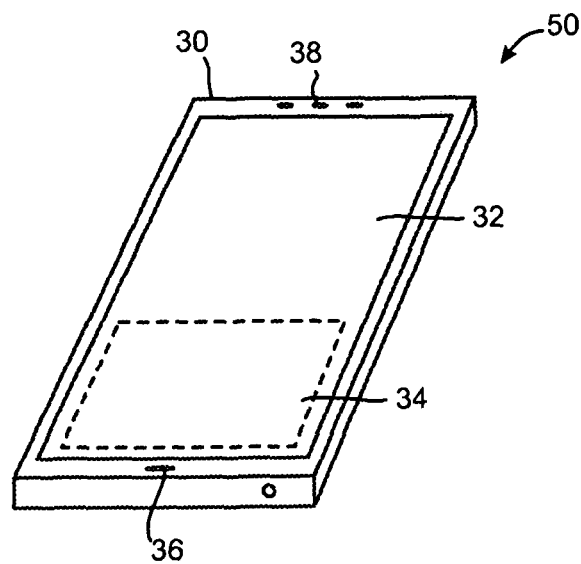
FIG. 2 shows an apparatus according to an example embodiment.

The following describes in further detail suitable apparatus and possible mechanisms for implementing the embodiments of the invention. In this regard reference is first made to FIG. 1 which shows a schematic block diagram of an exemplary apparatus or electronic device 50 depicted in FIG. 2, which may incorporate content delivery functionality according to some embodiments of the invention.

The electronic device 50 may for example be a mobile terminal or user equipment of a wireless communication system. However, it would be appreciated that embodiments of the invention may be implemented within any electronic device or apparatus which may utilize content delivery operations, either by setting content available for delivery and transmitting the content and/or by receiving the content.

The apparatus 50 may comprise a housing 30 for incorporating and protecting the device. The apparatus 50 may further comprise a display 32 e.g. in the form of a liquid crystal display, a light emitting diode (LED) display, an organic light emitting diode (OLED) display. In other embodiments of the invention the display may be any suitable display technology suitable to display information. The apparatus 50 may further comprise a keypad 34, which may be implemented by using keys or by using a touch screen of the electronic device. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (not shown) (or in other embodiments of the invention the device may be powered by any suitable mobile energy device such as solar cell, fuel cell or clockwork generator). The apparatus may further comprise a camera capable of recording or detecting imaging. In some embodiments the apparatus 50 may further comprise any suitable short range communication solution such as for example a Bluetooth wireless connection or a USB/firewire wired connection or an infra-red port for short range line of sight optical connection.

The apparatus 50 may comprise a controller 56 or processor for controlling the apparatus 50. The controller 56 may be connected to memory 58 which in embodiments of the invention may store both data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise one or more radio interface circuitries 52 connected to the controller and suitable for generating wireless communication signals for example for communication with a cellular communications network, a wireless communications system or a wireless local area network and/or with devices utilizing e.g. Bluetooth™ technology. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention.

For example, the system shown in FIG. 3 shows a mobile telephone network 11 and a representation of the internet 28. Connectivity to the Internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Although the above examples describe embodiments of the invention operating within an apparatus within an electronic device, it would be appreciated that the invention as described below may be implemented as part of any apparatus comprising a processor or similar element. Thus, for example, embodiments of the invention may be implemented in a wireless communication device. In some embodiments of the invention the apparatus need not comprise the communication means but may comprise an interface to input and output data to communication means external to the apparatus. As an example, the touch and share operations or part of them may be implemented in a software of a tablet computer, which may be connected to e.g. a Bluetooth adapter which contains means for enabling short range communication with other devices in the proximity supporting Bluetooth communication technology. As another example, the apparatus may be connected with a mobile phone to enable communication with other devices e.g. in the cloud model.

It shall be appreciated that the term user equipment is intended to cover any suitable type of wireless communication device, such as mobile telephones, portable data processing devices or portable web browsers.

Furthermore elements of a public land mobile network (PLMN) may also comprise transceivers as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following, some examples will be provided.

According to a first example, there is provided a method for an apparatus, comprising:
  receiving an indication of a content selected for delivery to destination devices;
  defining at least one delivery condition to be used to control the delivery of the selected content to the destination devices;
  forming a notification regarding the selected content;
  including information on the at least one delivery condition in the notification; and transmitting the notification,
wherein the at least one delivery condition includes at least one of a location condition and a time condition.

In some embodiments the method further comprises including the notification information identifying the content and information on the type of the content.

In some embodiments the method further comprises including authentication information as a further delivery condition to define who is authorized to deliver the selected content to the destination device.

In some embodiments the method further comprises including at least one of the following in the authentication information:
  a fingerprint;
  a password; or
  a gesture.

In some embodiments the method further comprises defining the location as coordinates and a range.

In some embodiments the method further comprises transmitting the notification by using a short range communication.

In some embodiments the method further comprises transmitting the notification to a wireless communication network.

In some embodiments the method further comprises:
  running an application by the apparatus applicable to handle contents of a certain type;
  showing information relating to the application on a display;
  identifying a touch on a touch sensitive element, the touch sensitive element being located at least partly above the display;
  determining the location of the touch;
  determining whether the location of the touch is in the area where the information relating to the application is shown on a display; and
  if so, requesting further information from a user of the apparatus to determining whether the content handled by the application is to be selected for delivery.

In some embodiments the method comprises delivering the selected content to two or more destination devices.

In some embodiments of the method the content is a data file.

In some embodiments of the method the data file contains at least one of the following:
  audio information;
  video information;
  a picture;
  text;
  an email;
  a calendar event;
  a presentation;
  a contact list.

According to a second example there is provided an apparatus comprising at least one processor and at least one memory including computer program code, the at least one memory and the computer program code configured to, with the at least one processor, cause the apparatus to perform at least the following:
  receiving an indication of a content selected for delivery to a destination device;
  defining at least one delivery condition to be used to control the delivery of the selected content to the destination device;
  forming a notification regarding the selected content;
  including information on the at least one delivery condition in the notification; and
  transmitting the notification,
  wherein the at least one delivery condition includes at least one of a location condition and a time condition.

In some embodiments of the apparatus said at least one memory stored with code thereon, which when executed by said at least one processor, further causes the apparatus to perform at least the following:
  including the notification information identifying the content and information on the type of the content.

In some embodiments of the apparatus said at least one memory stored with code thereon, which when executed by said at least one processor, further causes the apparatus to perform at least the following:
  including authentication information as a further delivery condition to define who is authorized to deliver the selected content to the destination device.

In some embodiments of the apparatus said at least one memory stored with code thereon, which when executed by said at least one processor, further causes the apparatus to perform at least the following:
  including at least one of the following in the authentication information:
  a fingerprint;
  a password; or
  a gesture.

In some embodiments of the apparatus said at least one memory stored with code thereon, which when executed by said at least one processor, further causes the apparatus to perform at least the following:
  defining the location as coordinates and a range.

In some embodiments of the apparatus said at least one memory stored with code thereon, which when executed by said at least one processor, further causes the apparatus to perform at least the following:
  transmitting the notification by using a short range communication.

In some embodiments of the apparatus said at least one memory stored with code thereon, which when executed by said at least one processor, further causes the apparatus to perform at least the following:
  transmitting the notification to a wireless communication network.

In some embodiments of the apparatus said at least one memory stored with code thereon, which when executed by said at least one processor, further causes the apparatus to perform at least the following:
  run an application by the apparatus applicable to handle contents of a certain type;
  show information relating to the application on a display;
  identify a touch on a touch sensitive element, the touch sensitive element being located at least partly above the display;
  determine the location of the touch;

determine whether the location of the touch is in the area where the information relating to the application is shown on a display; and if so, to request further information from a user of the apparatus to determining whether the content handled by the application is to be selected for delivery.

In some embodiments of the apparatus said at least one memory stored with code thereon, which when executed by said at least one processor, further causes the apparatus to deliver the selected content to two or more destination devices.

In some embodiments of the apparatus the content is a data file.

In some embodiments of the apparatus the data file contains at least one of the following:
audio information;
video information;
a picture;
text;
an email;
a calendar event;
a presentation;
a contact list.

According to a third example there is provided a computer program product including one or more sequences of one or more instructions which, when executed by one or more processors, cause an apparatus to perform at least the following:
receiving an indication of a content selected for delivery to a destination device;
defining at least one delivery condition to be used to control the delivery of the selected content to the destination device;
forming a notification regarding the selected content;
including information on the at least one delivery condition in the notification; and
transmitting the notification,
wherein the at least one delivery condition includes at least one of a location condition and a time condition.

In some embodiments the computer program product includes one or more sequences of one or more instructions which, when executed by one or more processors, cause the apparatus to include the notification information identifying the content and information on the type of the content.

In some embodiments the computer program product includes one or more sequences of one or more instructions which, when executed by one or more processors, cause the apparatus to include authentication information as a further delivery condition to define who is authorized to deliver the selected content to the destination device.

In some embodiments the computer program product includes one or more sequences of one or more instructions which, when executed by one or more processors, cause the apparatus to include at least one of the following in the authentication information:
a fingerprint;
a password; or
a gesture.

In some embodiments the computer program product includes one or more sequences of one or more instructions which, when executed by one or more processors, cause the apparatus to define the location as coordinates and a range.

In some embodiments the computer program product includes one or more sequences of one or more instructions which, when executed by one or more processors, cause the apparatus to transmit the notification by using a short range communication.

In some embodiments the computer program product includes one or more sequences of one or more instructions which, when executed by one or more processors, cause the apparatus to transmit the notification to a wireless communication network.

In some embodiments the computer program product includes one or more sequences of one or more instructions which, when executed by one or more processors, cause the apparatus to perform at least the following:
run an application by the apparatus applicable to handle contents of a certain type;
show information relating to the application on a display;
identify a touch on a touch sensitive element, the touch sensitive element being located at least partly above the display;
determine the location of the touch;
determine whether the location of the touch is in the area where the information relating to the application is shown on a display; and
if so, to request further information from a user of the apparatus to determining whether the content handled by the application is to be selected for delivery.

In some embodiments the computer program product includes one or more sequences of one or more instructions which, when executed by one or more processors, cause the apparatus to deliver the selected content to two or more destination devices.

In some embodiments of the computer program product the content is a data file.

In some embodiments of the computer program product the data file contains at least one of the following:
audio information;
video information;
a picture;
text;
an email;
a calendar event;
a presentation;
a contact list.

According to a fourth example there is provided an apparatus comprising:
means for receiving an indication of a content selected for delivery to a destination device;
means for defining at least one delivery condition to be used to control the delivery of the selected content to the destination device;
means for forming a notification regarding the selected content;
means for including information on the at least one delivery condition in the notification; and
means for transmitting the notification,
wherein the at least one delivery condition includes at least one of a location condition and a time condition.

In some embodiments the apparatus further comprises means for including the notification information identifying the content and information on the type of the content.

In some embodiments the apparatus further comprises means for including authentication information as a further delivery condition to define who is authorized to deliver the selected content to the destination device.

In some embodiments the apparatus further comprises means for including at least one of the following in the authentication information:
a fingerprint;
a password; or
a gesture.

In some embodiments the apparatus further comprises means for defining the location as coordinates and a range.

In some embodiments the apparatus further comprises means for transmitting the notification by using a short range communication.

In some embodiments the apparatus further comprises means for transmitting the notification to a wireless communication network.

In some embodiments the apparatus further comprises:
  means for running an application by the apparatus applicable to handle contents of a certain type;
  means for showing information relating to the application on a display;
  means for identifying a touch on a touch sensitive element, the touch sensitive element being located at least partly above the display;
  means for determining the location of the touch;
  means for determining whether the location of the touch is in the area where the information relating to the application is shown on a display; and
  means for requesting further information from a user of the apparatus to determining whether the content handled by the application is to be selected for delivery, if the location of the touch is in the area where the information relating to the application is shown on a display.

In some embodiments the apparatus further comprises means for delivering the selected content to two or more destination devices.

According to a fifth example there is provided a method for an apparatus, comprising:
  receiving an indication of a content selected for delivery from a source device to the apparatus;
  obtaining information of at least one delivery condition included in the notification to control the delivery of the selected content to the apparatus;
  examining whether the apparatus fulfills the delivery conditions; and
  if so, receiving the selected content.

In some embodiments the method further comprises receiving information identifying the content and information on the type of the content.

In some embodiments the method further comprises receiving authentication information as a further delivery condition to define who is authorized to receive the selected content by the destination device.

In some embodiments the method further comprises examining at least one of the following on the basis of the authentication information:
  a fingerprint;
  a password; or
  a gesture.

In some embodiments the method further comprises examining a location of the destination device and comparing the location with coordinates and range received in the notification in the examining whether the apparatus fulfills the delivery conditions.

In some embodiments the method further comprises receiving the notification by using a short range communication.

In some embodiments the method further comprises receiving the notification from a wireless communication network.

In some embodiments of the method the content is a data file.

In some embodiments of the method the data file contains at least one of the following:
  audio information;
  video information;
  a picture;
  text;
  an email;
  a calendar event;
  a presentation;
  a contact list.

According to a sixth example there is provided an apparatus comprising at least one processor and at least one memory including computer program code, the at least one memory and the computer program code configured to, with the at least one processor, cause the apparatus to perform at least the following:
  receiving an indication of a content selected for delivery from a source device to the apparatus;
  obtaining from the notification information of at least one delivery condition to control the delivery of the selected content to the apparatus;
  examining whether the apparatus fulfills the delivery conditions; and
  if so, receiving the selected content.

In some embodiments of the apparatus said at least one memory stored with code thereon, which when executed by said at least one processor, further causes the apparatus to receive information identifying the content and information on the type of the content.

In some embodiments of the apparatus said at least one memory stored with code thereon, which when executed by said at least one processor, further causes the apparatus to receive authentication information as a further delivery condition to define who is authorized to receive the selected content by the destination device.

In some embodiments of the apparatus said at least one memory stored with code thereon, which when executed by said at least one processor, further causes the apparatus to examine at least one of the following on the basis of the authentication information:
  a fingerprint;
  a password; or
  a gesture.

In some embodiments of the apparatus said at least one memory stored with code thereon, which when executed by said at least one processor, further causes the apparatus to examine a location of the destination device and to compare the location with coordinates and range received in the notification in the examining whether the apparatus fulfills the delivery conditions.

In some embodiments of the apparatus said at least one memory stored with code thereon, which when executed by said at least one processor, further causes the apparatus to receive the notification by using a short range communication.

In some embodiments of the apparatus said at least one memory stored with code thereon, which when executed by said at least one processor, further causes the apparatus to receive the notification from a wireless communication network.

In some embodiments of the apparatus the content is a data file.

In some embodiments of the apparatus the data file contains at least one of the following:
  audio information;
  video information;
  a picture;
  text;
  an email;

a calendar event;
a presentation;
a contact list.

According to a seventh example there is provided a computer program product including one or more sequences of one or more instructions which, when executed by one or more processors, cause an apparatus to perform at least the following:
  receiving an indication of a content selected for delivery from a source device to the apparatus;
  obtaining information of at least one delivery condition included in the notification to control the delivery of the selected content to the apparatus;
  examining whether the apparatus fulfills the delivery conditions; and
  if so, receiving the selected content.

In some embodiments the computer program product includes one or more sequences of one or more instructions which, when executed by one or more processors, cause the apparatus to receive information identifying the content and information on the type of the content.

In some embodiments the computer program product includes one or more sequences of one or more instructions which, when executed by one or more processors, cause the apparatus to receive authentication information as a further delivery condition to define who is authorized to receive the selected content by the destination device.

In some embodiments the computer program product includes one or more sequences of one or more instructions which, when executed by one or more processors, cause the apparatus to examine at least one of the following on the basis of the authentication information:
  a fingerprint;
  a password; or
  a gesture.

In some embodiments the computer program product includes one or more sequences of one or more instructions which, when executed by one or more processors, cause the apparatus to examine a location of the destination device and to compare the location with coordinates and range received in the notification in the examining whether the apparatus fulfills the delivery conditions.

In some embodiments the computer program product includes one or more sequences of one or more instructions which, when executed by one or more processors, cause the apparatus to receive the notification by using a short range communication.

In some embodiments the computer program product includes one or more sequences of one or more instructions which, when executed by one or more processors, cause the apparatus to receive the notification from a wireless communication network.

In some embodiments of the computer program product the content is a data file.

In some embodiments of the computer program product the data file contains at least one of the following:
  audio information;
  video information;
  a picture;
  text;
  an email;
  a calendar event;
  a presentation;
  a contact list.

According to an eighth example there is provided an apparatus comprising:
  means for receiving an indication of a content selected for delivery from a source device to the apparatus;
  means for obtaining from the notification information of at least one delivery condition to control the delivery of the selected content to the apparatus;
  means for examining whether the apparatus fulfills the delivery conditions; and
  means for receiving the selected content adapted to receive the content, if the examining indicates that the apparatus fulfills the delivery conditions.

In some embodiments the apparatus further comprises means for receiving information identifying the content and information on the type of the content.

In some embodiments the apparatus further comprises means for receiving authentication information as a further delivery condition to define who is authorized to receive the selected content by the destination device.

In some embodiments the apparatus further comprises means for examining at least one of the following on the basis of the authentication information:
  a fingerprint;
  a password; or
  a gesture.

In some embodiments the apparatus further comprises means for examining a location of the destination device and means for comparing the location with coordinates and range received in the notification in the examining whether the apparatus fulfills the delivery conditions.

In some embodiments the apparatus further comprises means for receiving the notification by using a short range communication.

In some embodiments the apparatus further comprises means for receiving the notification from a wireless communication network.

The invention claimed is:

1. A method for an apparatus comprising a touch sensitive element configured to identify a touch on the touch sensitive element, the method comprising:
  receiving an indication of a content selected for delivery from the apparatus to a destination apparatus, wherein the selected content comprises one or more files containing video or audio content;
  defining at least one delivery condition comprising at least one of a location condition or a time condition, the at least one delivery condition to be used to determine whether the delivery of the selected content from the apparatus to the destination apparatus is allowed;
  examining a type of the selected content by examining an application handling the content or by examining a file extension of the content;
  in an instance in which the destination apparatus is within a predetermined distance of the apparatus, directly transmitting a notification regarding the selected content to be shared from the apparatus to the destination apparatus, the notification comprising information on the type of the selected content, one or more identifiers indicating the selected content to be shared, information on the at least one delivery condition, and authentication information comprising a user's fingerprint, captured from any portion of the touch sensitive element, as a further delivery condition to define who is authorized to deliver the selected content to the destination apparatus; and
  in an instance in which the destination apparatus fulfills the at least one delivery condition and is authorized to receive the selected content, transmitting the selected content in response to receiving a request for the selected content from the destination apparatus, said request comprising an indication that the destination apparatus fulfills the delivery conditions, wherein the selected content is authorized for presentation by the destination apparatus in response to receiving, at the destination apparatus, the user's fingerprint.

2. A method according to claim 1, further comprising including the notification information identifying the content and information on the type of the content.

3. A method according to claim 1, further comprising including at least one of the following in the authentication information:
a password; and
a gesture.

4. A method according to claim 1, further comprising defining the predetermined distance based upon a location of the apparatus as coordinates and a range around the location defined by the coordinates.

5. A method according to claim 1, further comprising:
running an application by the apparatus applicable to handle contents of a certain type;
showing information relating to the application on a display;
identifying the touch on the touch sensitive element, the touch sensitive element being located in front of the display;
determining the location of the touch;
determining whether the location of the touch is in the area where the information relating to the application is shown on a display; and
if so, requesting further information from a user of the apparatus to determining whether the content handled by the application is to be selected for delivery.

6. A method according to claim 1, further comprising:
comparing the user's fingerprint captured by the apparatus to the user's fingerprint captured by the destination apparatus,
wherein transmitting the selected content as the response to the request comprises transmitting, if the user's fingerprint captured by the apparatus is the same as the user's fingerprint captured by the destination apparatus, the selected content as the response to the request.

7. A method according to claim 6, further comprising:
receiving at the apparatus, from the destination apparatus, the user's fingerprint captured by the destination apparatus.

8. An apparatus comprising at least one processor and at least one memory including computer program code, the at least one memory and the computer program code configured to, with the at least one processor, cause the apparatus to perform at least the following:
receive an indication of a content selected for delivery from the apparatus to a destination apparatus, wherein the selected content comprises one or more files containing video or audio content;
define at least one delivery condition comprising at least one of a location condition or a time condition, the at least one delivery condition to be used to determine whether the delivery of the selected content from the apparatus to the destination apparatus is allowed;
examine a type of the selected content by examining an application handling the content or by examining a file extension of the content;
in an instance in which the destination apparatus is within a predetermined distance of the apparatus, directly transmit a notification regarding the selected content to be shared, the notification comprising information on the type of the selected content, one or more identifiers indicating the selected content to be shared, information on the at least one delivery condition in the notification, and authentication information comprising a user's fingerprint, captured from any portion of a touch sensitive element of the apparatus, as a further delivery condition to define who is authorized to deliver the selected content to the destination apparatus; and
in an instance in which the destination apparatus fulfills the at least one delivery condition and is authorized to receive the selected content, transmit the selected content in response to receiving a request for the selected content from the destination apparatus, said request comprising an indication that the destination apparatus fulfills the delivery conditions,
wherein the selected content is authorized for presentation by the destination apparatus in response to receiving, at the destination apparatus, the user's fingerprint.

9. An apparatus according to claim 8, further comprising computer program code configured to, with the at least one processor, cause the apparatus to perform at least the following:
include the notification information identifying the content and information on the type of the content.

10. An apparatus according to claim 8, further comprising computer program code configured to, with the at least one processor, cause the apparatus to perform at least the following:
include at least one of the following in the authentication information:
a password; and
a gesture.

11. An apparatus according to claim 8, further comprising computer program code configured to, with the at least one processor, cause the apparatus to perform at least the following:
define the predetermined distance based upon a location of the apparatus as coordinates and a range around the location defined by the coordinates.

12. An apparatus according to claim 8, further comprising computer program code configured to, with the at least one processor, cause the apparatus to perform at least the following:
transmit the notification by using a short range communication.

13. An apparatus according to claim 8, further comprising computer program code configured to, with the at least one processor, cause the apparatus to perform at least the following:
transmit the notification to a wireless communication network.

14. An apparatus according to claim 8, further comprising computer program code configured to, with the at least one processor, cause the apparatus to perform at least the following:
run an application by the apparatus applicable to handle contents of a certain type;
show information relating to the application on a display;
identify the touch on the touch sensitive element, the touch sensitive element being located in front of the display;
determine the location of the touch;
determine whether the location of the touch is in the area where the information relating to the application is shown on a display; and if so, to request further information from a user of the apparatus to determining whether the content handled by the application is to be selected for delivery.

15. An apparatus according to claim 8, further comprising computer program code configured to, with the at least one processor, cause the apparatus to perform at least the following:
   compare the user's fingerprint captured by the apparatus to the user's fingerprint captured by the destination apparatus,
   wherein transmit the selected content as the response to the request comprises transmit, if the user's fingerprint captured by the apparatus is the same as the user's fingerprint captured by the destination apparatus, the selected content as the response to the request.

16. An apparatus according to claim 15, further comprising computer program code configured to, with the at least one processor, cause the apparatus to perform at least the following:
   receive at the apparatus, from the destination apparatus, the user's fingerprint captured by the destination apparatus.

\* \* \* \* \*